(12) United States Patent
Newstadt et al.

(10) Patent No.: US 7,941,379 B1
(45) Date of Patent: May 10, 2011

(54) SYSTEMS AND METHODS FOR USING GEO-LOCATION INFORMATION IN SENSITIVE INTERNET TRANSACTIONS

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 35 days.

(21) Appl. No.: 12/491,540

(22) Filed: Jun. 25, 2009

(51) Int. Cl.
*G06Q 20/00* (2006.01)
*G06F 21/00* (2006.01)

(52) U.S. Cl. .......................... 705/64; 705/50
(58) Field of Classification Search ............. 705/64
See application file for complete search history.

(56) References Cited

U.S. PATENT DOCUMENTS

| | | | | |
|---|---|---|---|---|
| 6,061,390 | A * | 5/2000 | Meehan et al. | 375/150 |
| 6,438,381 | B1 * | 8/2002 | Alberth et al. | 455/456.5 |
| 7,200,658 | B2 | 4/2007 | Goeller et al. | |
| 7,403,922 | B1 * | 7/2008 | Lewis et al. | 705/38 |
| 7,707,413 | B2 * | 4/2010 | Lunt et al. | 713/168 |
| 2004/0091111 | A1 * | 5/2004 | Levy et al. | 380/202 |
| 2006/0123462 | A1 * | 6/2006 | Lunt et al. | 726/1 |
| 2007/0100981 | A1 * | 5/2007 | Adamczyk et al. | 709/223 |
| 2008/0140576 | A1 * | 6/2008 | Lewis et al. | 705/67 |
| 2009/0195443 | A1 * | 8/2009 | Levin et al. | 342/352 |
| 2009/0231193 | A1 * | 9/2009 | Bu | 342/357.15 |
| 2010/0134349 | A1 * | 6/2010 | Lennen et al. | 342/357.03 |
| 2010/0164787 | A1 * | 7/2010 | Khosravy et al. | 342/357.1 |
| 2010/0195829 | A1 * | 8/2010 | Blom et al. | 380/255 |

FOREIGN PATENT DOCUMENTS

| | | | |
|---|---|---|---|
| WO | WO2008133590 | * | 11/2008 |
| WO | WO2008133590 A9 | * | 11/2008 |
| WO | WO2010083113 A1 | * | 7/2010 |

OTHER PUBLICATIONS

"GPS: Location Tracking Technology", Bajaj et al., Computer Magazine, Apr. 2002, 3 pages.*
"How Does the Global Positioning System (GPS) Work?", Darren Griffin, PocketGPSWorld.com, Jun. 27, 2008, 8 pages.*
"Charge Anywhere Turns Mobiles Into POS Terminals; The company's Secure Mobile Payment software works with Windows Mobile 5.0 and RIM 4.1 devices", Information Week, Apr. 7, 2008.*

* cited by examiner

*Primary Examiner* — Calvin L Hewitt, II
*Assistant Examiner* — James D Nigh
(74) *Attorney, Agent, or Firm* — Advantedge Law Group

(57) ABSTRACT

A computer-implemented method for using geo-location information in sensitive Internet transactions is disclosed. In one example, such a method may include: 1) receiving, from a client device, a request to conduct an Internet transaction, 2) requiring geo-location information from the client device in order to conduct the Internet transaction, 3) receiving the geo-location information from the client device, 4) verifying the validity of the geo-location information, and then 5) conducting the Internet transaction. Various other methods, systems, and computer-readable media are also disclosed.

12 Claims, 6 Drawing Sheets

SYSTEMS AND METHODS FOR USING GEO-LOCATION INFORMATION IN SENSITIVE INTERNET TRANSACTIONS

BACKGROUND

The proliferation of the Internet has changed the way we work and play. Unfortunately, the level of anonymity provided by the Internet may also enable criminals to commit crimes with reduced risks of apprehension. For example, an identity thief may purchase goods using a stolen credit card or withdraw funds from a victim's bank account via the Internet without having to physically present himself or herself at a store or bank. Similarly, a child predator may groom a child for later assault via the Internet without having to physically follow or communicate with the child.

While there are certainly Internet transactions that benefit from the level of anonymity provided by the Internet, the instant disclosure identifies a need for systems and methods that require participants of certain sensitive Internet transactions (such as banking transactions or communications with minors) to assume a certain level of exposure and/or accountability.

SUMMARY

As will be described in greater detail below, the instant disclosure generally relates to systems and methods for using geo-location information in sensitive Internet transactions, such as e-banking transactions or communications with minors. In one example, an exemplary server-side method for performing such a task may include: 1) receiving, from a client device, a request to conduct a sensitive Internet transaction, 2) requiring geo-location information from the client device in order to conduct the Internet transaction, 3) receiving the geo-location information from the client device, 4) verifying the validity of the geo-location information, and then 5) conducting the Internet transaction.

Examples of geo-location information that may be received from the client device include, without limitation, raw GPS satellite signals, satellite identification codes for at least one GPS satellite, latitude and longitude coordinates, GPS-satellite-signal timestamps, and any other type of information that may be used to determine and/or verify the geographic location of a device or user. In some examples, this geo-location information may be digitally signed by the client device (using, for example, SSL or TLS), a GPS receiver in communication with the client device, and/or a GPS satellite (using, for example, a government-issued private encryption key).

The server may request or require the geo-location information in a variety of ways, including, for example, via a low-level authentication protocol, a high-level web API, and/or a web form. In some embodiments, prior to transmitting the geo-location information the server, the client device may display a privacy notice to a user of the device that allows the user to block transmission of the requested geo-location information, which may, in turn, terminate the Internet transaction.

The server may verify the validity of the geo-location information in a variety of ways, including, for example: 1) by determining whether the signal strengths of the raw GPS satellite signals exceed a predetermined threshold (by, for example, measuring the absolute signal strengths of the GPS satellite signals), 2) by determining whether the signal strengths of the raw GPS satellite signals vary by more than a predetermined threshold (by, for example, measuring the relative signal strengths of the GPS satellite signals), and/or 3) by comparing the signal strengths of the raw GPS satellite signals with a known location of at least one GPS satellite allegedly responsible for generating the raw GPS satellite signals. In addition, if the geo-location information is digitally signed to ensure its integrity, the server may digitally decrypt the digitally signed geo-location information using, for example, a public decryption key.

Upon verifying the validity of the geo-location information, the server may determine the location of a user of the client device through, for example, triangulation or trilateration. The server may then store the geo-location information (and/or the location of the user of the client device) in a database and associate the same with the Internet transaction in question. In one example, this database may be maintained by a trusted third party.

By obtaining and storing geo-location information during sensitive Internet transactions (such as banking transactions or electronic communications with minors), the systems and methods disclosed herein may deter criminals from committing illegal activities via such transactions. In addition, this geo-location information may be used to track or identify the location of fraudulent or criminal users that participate in such transactions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
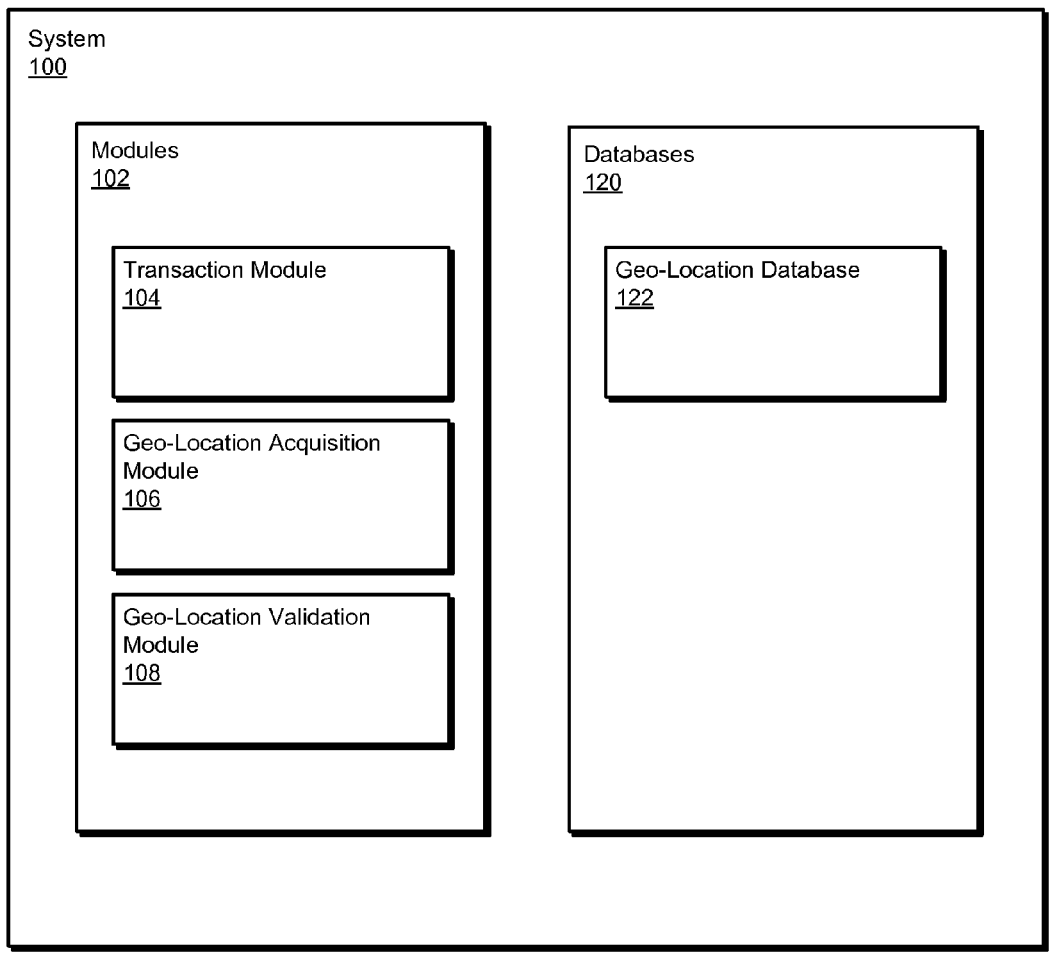
FIG. 1 is a block diagram of an exemplary system for using geo-location information in sensitive Internet transactions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using geo-location information in sensitive Internet transactions. As will be explained in greater detail below, the phrase "geo-location information" generally refers to information that may be used to identify the geographic location of a computing device and/or a user of the same. Examples of geo-location information include, without limitation, raw GPS satellite signals, GPS-satellite-identification codes, latitude and longitude coordinates, GPS satellite timestamps, and any other type of information that may be used to identify or validate the geographic location of a device or user.

As will be explained in greater detail below, this geo-location information may be required in any electronic transaction that may benefit from requiring participants to assume an increased level of exposure and/or accountability. Examples of such transactions include, without limitation, e-commerce transactions, e-banking transactions, electronic communications with minors, electronic transactions with government entities, or the like.

Figure 2:
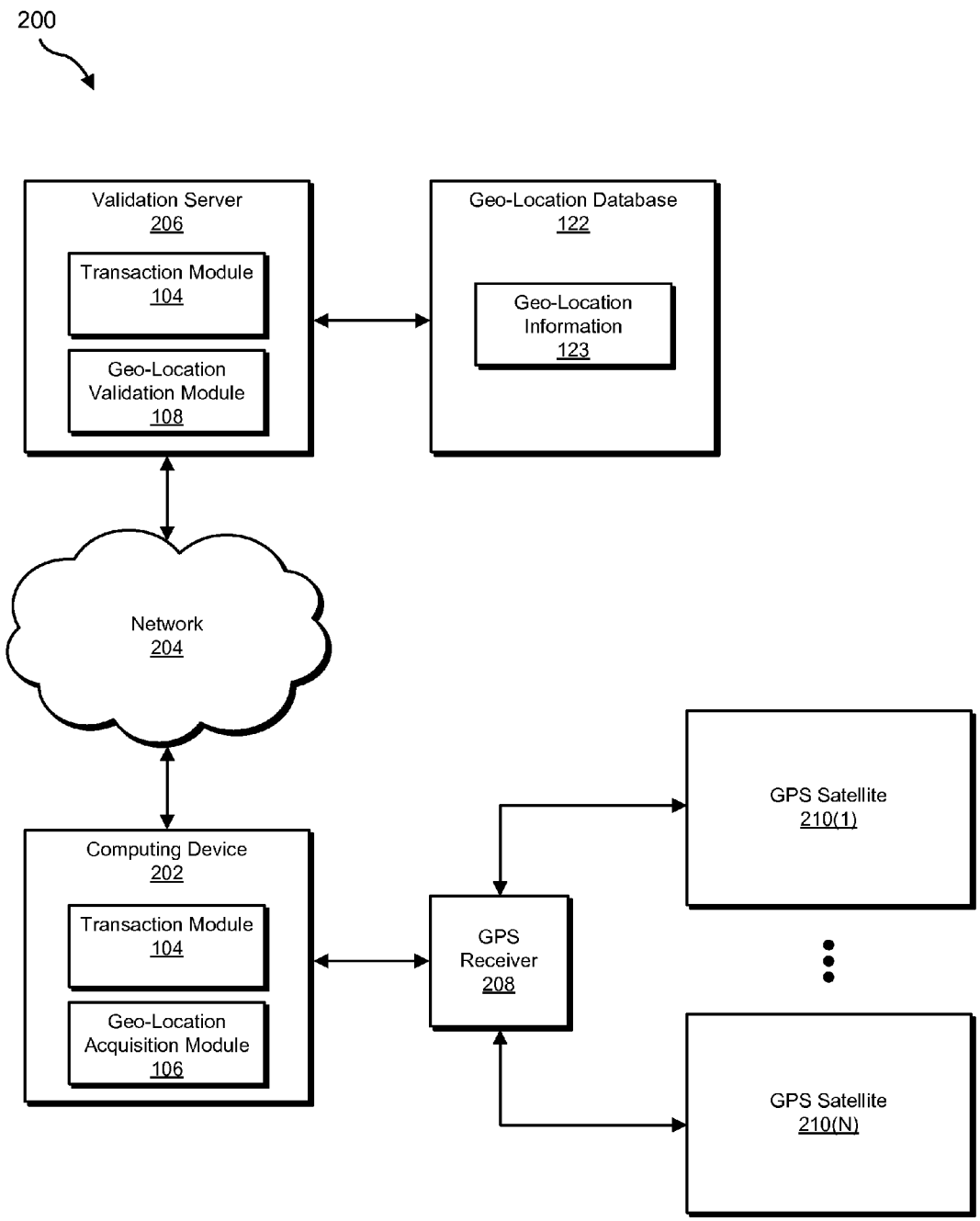
FIG. 2 is a block diagram of an exemplary system for using geo-location information in sensitive Internet transactions.

The following will provide, with reference to FIGS. 1-2, detailed descriptions of exemplary systems for using geo-location information in sensitive Internet transactions. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using geo-location information in sensitive Internet transactions. As illustrated in this figure, exemplary system 100 may include one or more modules 102 for performing one or more tasks. For example, and as will be explained in greater detail below, exemplary system 100 may include a transaction module 104 programmed to initiate and conduct various Internet transactions.

Exemplary system 100 may also include a geo-location acquisition module 106 programmed to request and acquire geo-location information from a GPS device. In addition, and as will be described in greater detail below, exemplary system 100 may include a geo-location validation module 108 programmed to verify the validity of geo-location information received from client devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or validation server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a geo-location database 122 for storing geo-location information 123 (shown in FIG. 2) received from client devices during Internet transactions.

Databases 120 in FIG. 1 may represent a portion of one or more computing devices. For example, databases 120 may represent a portion of validation server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as validation server 206 in FIG. 2, computing system 510 in FIG. 5, and/or portions of exemplary network architecture 600 in FIG. 6. For example, geo-location database 122 may represent a database maintained by a trusted third party. In this example, geo-location information 123 stored in geo-location database 122 may only be accessible in certain circumstances, such as when subpoenaed or required by law-enforcement officers.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing device 202 in communication with a validation server 206 via a network 204. Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Validation server 206 generally represents any type or form of computing device that is capable of conducting Internet transactions. Examples of validation server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and validation server 206.

As will be explained in greater detail below, in one example transaction module 104 and/or geo-location validation module 108 may program validation server 206 to: 1) receive, from computing device 202, a request to conduct an Internet transaction, 2) require geo-location information from computing device 202 in order to conduct the Internet transaction, 3) receive the geo-location information from computing device 202, 4) verify the validity of the geo-location information, and 5) upon verifying the validity of the geo-location information, conduct the Internet transaction. In some examples, validation server 206 may then store this geo-location information in geo-location database 122 and associate the same with the Internet transaction in question.

Similarly, transaction module 104 and/or geo-location acquisition module 106 may program computing device 202 to: 1) transmit, to validation server 206, a request to conduct an Internet transaction, 2) receive, from validation server 206, a request for geo-location information in order to complete the Internet transaction, 3) request geo-location information from GPS receiver 208, 4) receive this geo-location information from GPS receiver 208, 5) provide this geo-location information to validation server 206, and then 6) conduct the Internet transaction.

GPS receiver 208 generally represents any type or form of GPS device or receiver. In some examples, GPS receiver 208 may determine its geo-location through, for example, triangulation or trilateration of three or more GPS satellite signals. For example, GPS receiver 208 may trilaterate signals received from GPS satellites 210(1)-(N) in order to determine its current geo-location. In other examples, GPS receiver 208 may simply pass geo-location information (such as the raw GPS satellite signals received from GPS satellites 210(1)-(N)) directly to computing device 202. In some examples, GPS receiver 208 may represent a portion of computing device 202. In other examples, GPS receiver 208 may represent one or more physically separate devices or peripherals capable of being accessed by computing device 202.

Figure 3:
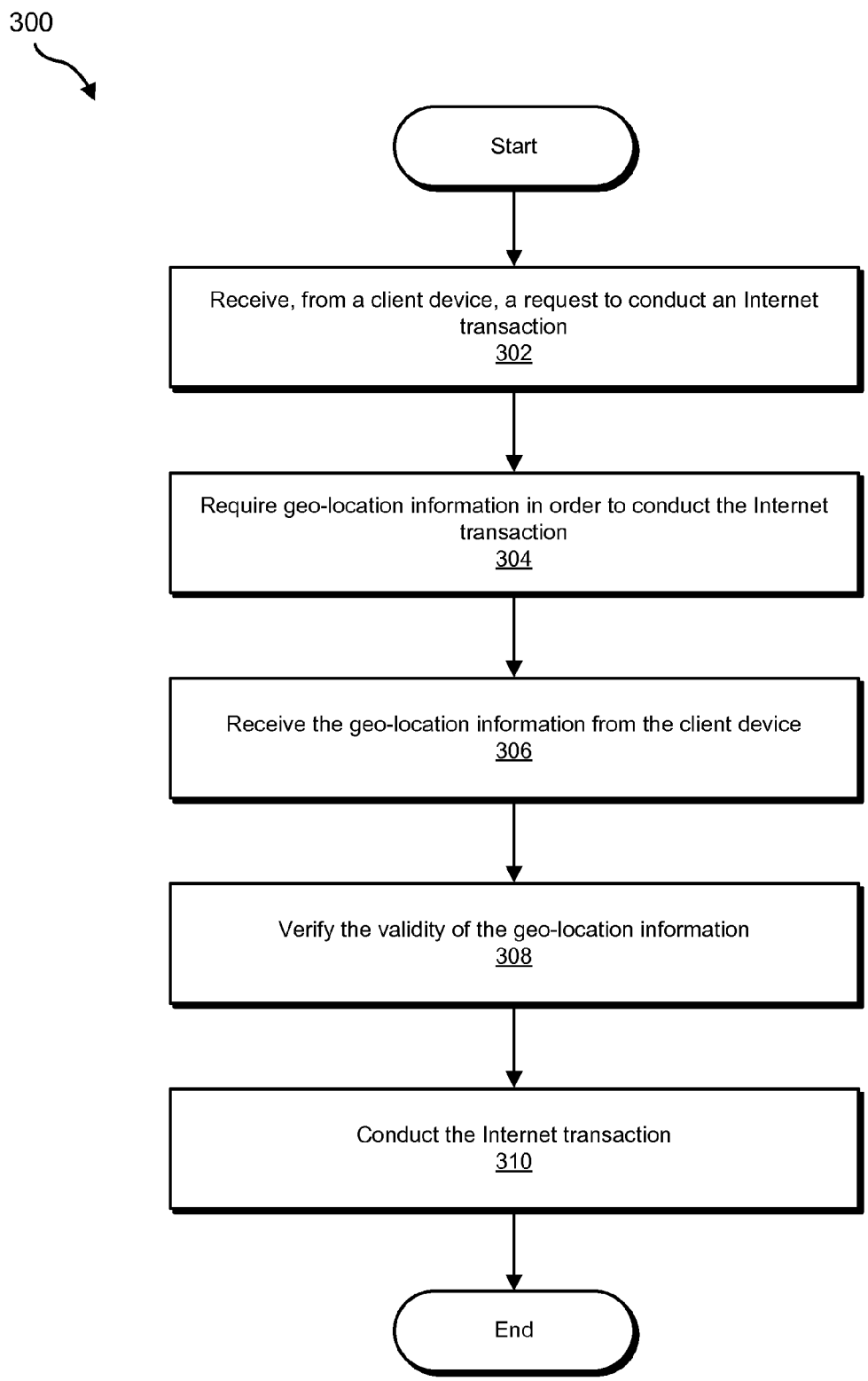
FIG. 3 is a flow diagram of an exemplary server-side method for using geo-location information in sensitive Internet transactions.

FIG. 3 is a block diagram of an exemplary server-side computer-implemented method 300 for using geo-location information in sensitive Internet transactions. The steps shown in FIG. 3 may be performed by any suitable computer-executable code and/or computing system. In some embodiments, the steps shown in FIG. 3 may be performed by one or more of the components of system 100 in FIG. 1 and/or system 200 and FIG. 2.

As illustrated in FIG. 3, at step 302 the system may receive, from a client device, a request to conduct an Internet transaction. For example, validation server 206 in FIG. 2 (which may, as detailed above, comprise transaction module 104 from FIG. 1) may receive (via network 204) a request from computing device 202 (which may, as detailed above, comprise transaction module 104) to conduct a sensitive Internet transaction (such as an e-banking transaction or an electronic communication with a minor).

As detailed above, the Internet transaction requested in step 302 may represent any type of potentially sensitive Internet transaction. Examples of such Internet transactions include, without limitation, an e-commerce transaction (such as an attempt to purchase goods from an online retailer), an e-banking transaction (such as an attempt to transfer funds from an online bank account), an electronic communication with a minor (such as an attempt to communicate with a minor via a social-networking website), an electronic transaction with a government entity, or the like.

At step 304, the system may require geo-location information from the computing device in order to conduct the Internet transaction. For example, validation server 206 (which may, as detailed above, comprise geo-location validation module 108) may request geo-location information from computing device 202 in order to conduct the Internet transaction requested in step 302.

As used herein, the phrase "geo-location information," may refer to information that identifies the real-world geographic location of a computing device or user of the same. Validation server 206 may require or request geo-location information from computing device 202 in a variety of ways. For example, validation server 206 may request geo-location information from computing device 202 via a low-level authentication protocol, via a high-level web API, via a web form, or the like.

At step 306, the system may receive the geo-location information from the client device. For example, validation server 206 may receive, via network 204, geo-location information from computing device 202.

As will be explained in greater detail below in connection with FIG. 4, computing device 202 (which may, as detailed above, comprise geo-location acquisition module 106) may obtain the geo-location information provided to validation server 206 in step 306 from GPS receiver 208. Examples of geo-location information that may be received from GPS receiver 208 include, without limitation, raw GPS satellite signals (received, for example, from GPS satellites 210(1)-(N)), identification information for at least one GPS satellite (e.g., satellite identification codes for GPS satellites 210(1)-(N)), latitude and longitude coordinates, timestamps, or any other information that may be useful in determining and/or verifying the geographic location of GPS receiver 208 and/or computing device 202.

Returning to FIG. 3, at step 308 the system may verify the validity of the geo-location information received in step 306. For example, validation server 206 (which may, as detailed above, comprise geo-location validation module 108) may verify the validity of the geo-location information provided by computing device 202 in step 306.

Validation server 206 may verify the validity of geo-location information in a variety of ways. For example, geo-location validation module 108 may: 1) determine whether the signal strengths of the raw GPS satellite signals received from computing device 202 exceed a predetermined threshold (which may, in some examples, indicate that the provided GPS satellite signals are false or illegitimate), 2) determine whether the signal strengths of the raw GPS satellite signals vary by more than a predetermined threshold (which may indicate that the GPS satellite signals are false or illegitimate), and/or 3) compare the signal strengths of the raw GPS satellite signals with a known location of at least one GPS satellite allegedly responsible for generating the raw GPS satellite signals provided by computing device 202 (differences between which may indicate that the GPS satellite signals are false or illegitimate).

In some examples, the geo-location information provided by computing device 202 in step 306 may be digitally signed by computing device 202 (using, for example, a communications protocol such as SSL or TLS), GPS receiver 208, and/or GPS satellites 210(1)-(N) (using, for example, a cryptographic private key). In these examples, geo-location validation module 108 may verify the validity of the geo-location information received from computing device 202 by decrypting the digitally signed geo-location information.

For example, geo-location validation module 108 may decrypt (using, for example, a GPS satellite's public decryption key) geo-location information that has been encrypted by the GPS satellite in order to verify that the geo-location information in fact originated from the GPS satellite in question. Similarly, geo-location validation module 108 may decrypt (using, for example, a public decryption key) geo-location information that has been encrypted by computing device 202 (using, for example, a SSL or TLS private encryption key) in order to verify that the geo-location information in question in fact originated from computing device 202.

Returning to FIG. 3, at step 310 the system may conduct the Internet transaction requested in step 302. For example, upon verifying the validity of the geo-location information received in step 308, validation server 206 may complete the Internet transaction requested in step 302 with computing device 202. Upon completion of step 310, exemplary method 300 in FIG. 3 may terminate.

In at least one example, validation server 206 (which may, as detailed above, comprise geo-location validation module 108) may determine the location of a user of computing device 202 by analyzing the geo-location information provided by computing device 202 in step 306. For example, validation server 206 may triangulate or trilaterate the signals received from three or more GPS satellites in order to determine the location of the user of computing device 202.

Validation server 206 may then store this information (along with the raw geo-location information received from computing device 202) as geo-location information 123 in geo-location database 122 in FIG. 2. In some examples, validation server 206 may associate geo-location information 123 and/or information that identifies the location of the user of computing device 202 with the Internet transaction in question. In this way, an administrator or user of geo-location database 122 (e.g., a law-enforcement officer) may be able to quickly determine the geographic location of the user involved in a prior Internet transaction by retrieving the geo-location information 123 associated with this prior Internet transaction from geo-location database 122. In some examples, geo-location database 122 may be maintained by an administrator of validation server 206 (e.g., a bank). Alternatively, geo-location database 122 may be maintained by a trusted third party.

Although not illustrated in FIG. 3, in some examples exemplary method 300 in FIG. 3 may also include enabling an administrator of a client account to require geo-location information in order to conduct an Internet transaction involving the client account. For example, a bank may allow its clients to require geo-location information when conducting Internet transactions involving each client's account. In this example, validation server 206 may require geo-location information from any user that attempts to conduct an Internet transaction involving the client account.

Figure 4:
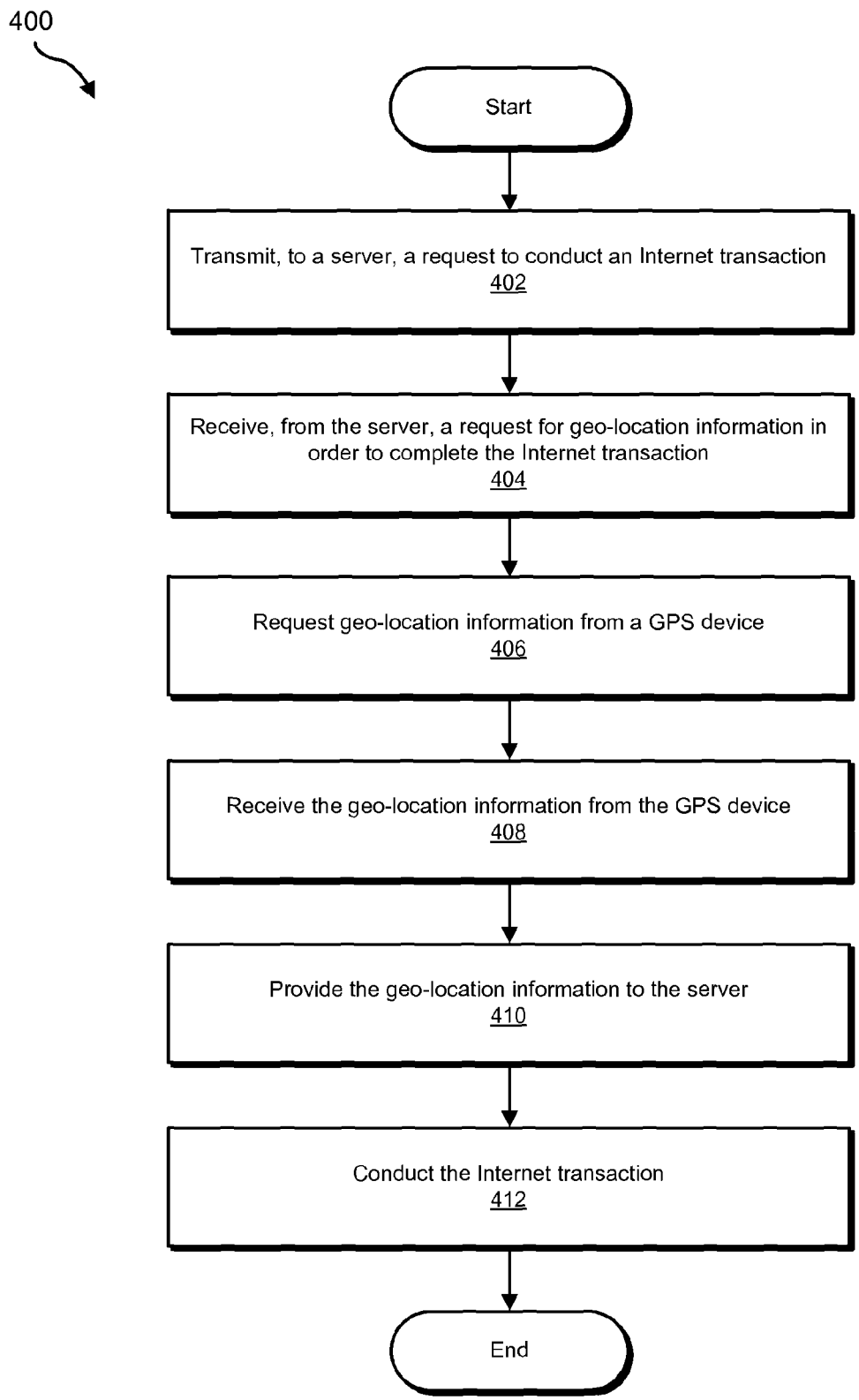
FIG. 4 is a flow diagram of an exemplary client-side method for using geo-location information in sensitive Internet transactions.

FIG. 4 is a flow diagram of an exemplary client-side computer-implemented method 400 for using geo-location information in sensitive Internet transactions. As with FIG. 3, the steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 the system may transmit, to a server, a request to conduct an Internet transaction. For example, computing device 202 in FIG. 2 (which may, as detailed above, comprise transaction module 104) may transmit a request to conduct an Internet transaction to validation server 206 (which may, as detailed above, comprise transaction module 104).

At step 404, the system may receive, from the server, a request for geo-location information in order to complete the Internet transaction. For example, computing device 202 may be required to provide geo-location information to validation server 206 in order to conduct the Internet transaction requested in step 402. As detailed above, computing device 202 may receive a request for geo-location information in a variety of ways, including, for example, via a low-level authentication protocol, via a high-level Web API, via a Web form, or the like.

At step 406, the system may request geo-location information from a GPS device. For example, computing device 202 (which may, as detailed above, comprise geo-location acquisition module 106) may request geo-location information from GPS receiver 208.

At step 408, the system may receive the geo-location information from the GPS device. For example, computing device 202 may receive geo-location information from GPS receiver 208.

As detailed above, this geo-location information may include raw GPS satellite signals (received, for example, from GPS satellites 210(1)-(N)), identification information (such as satellite identification codes) for at least one GPS satellite (such as GPS satellites 210(1)-(N)), latitude and longitude coordinates, GPS-satellite-signal timestamps, or any other information that may be used to determine or verify the geographic location of GPS receiver 208 and/or computing device 202. In some examples, this geo-location information may be digitally signed by GPS satellites 210(1)-(N), GPS receiver 208, and/or computing device 202, as explained above.

At step 410, the system may provide the geo-location information to the server. For example, computing device 202 may provide the geo-location information received from GPS receiver 208 to validation server 206.

In some examples, computing device 202 may, prior to providing the geo-location information to validation server 206 in step 410, display a privacy notice to a user of computing device 202 that requests permission to transmit the geo-location information to validation server 206. In this example, the privacy notice may provide the user of computing device 202 with an opportunity to decline transmission of the geo-location information, which may in turn terminate the Internet transaction.

At step 412, the system may conduct the Internet transaction. For example, upon receiving the geo-location information provided in step 410, validation server 206 may allow computing device 202 to complete the Internet transaction requested in step 402. Upon completion of step 412, exemplary method 400 in FIG. 4 may terminate.

By obtaining and storing geo-location information during sensitive Internet transactions (such as banking transactions or electronic communications with minors), the systems and methods disclosed herein may deter criminals from committing illegal activities via such transactions. In addition, this geo-location information may be used to track or identify the location of fraudulent or criminal users that participate in such transactions.

Figure 5:
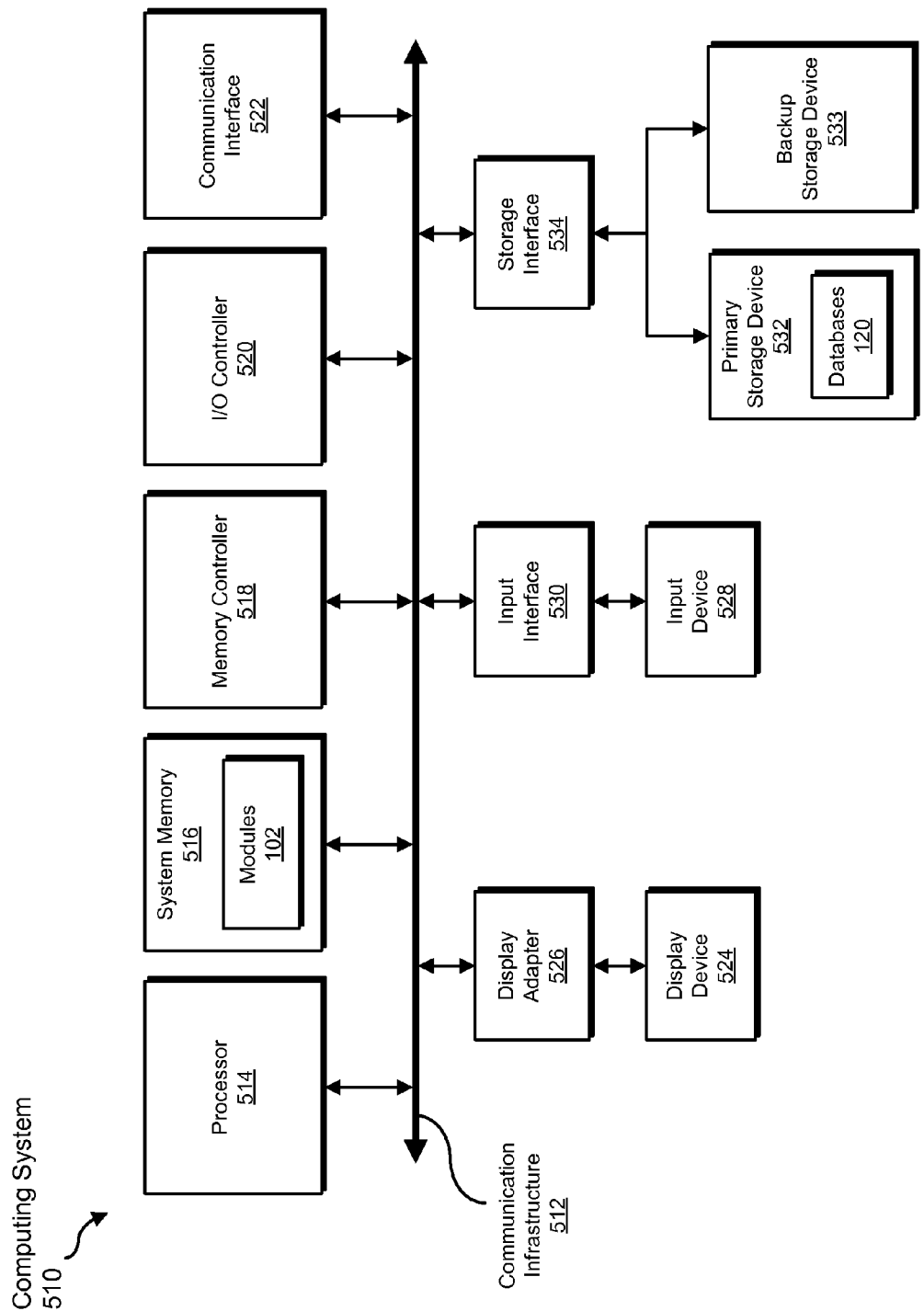
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, requiring, verifying, conducting, determining, storing, associating, comparing, decrypting, retrieving, requesting, transmitting, providing, and prompting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as receiving, requiring, verifying, conducting, determining, storing, associating, comparing, decrypting, retrieving, requesting, transmitting, providing, and prompting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, requiring, verifying, conducting, determining, storing, associating, comparing, decrypting, retrieving, requesting, transmitting, providing, and prompting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, requiring, verifying, conducting, determining, storing, associating, comparing, decrypting, retrieving, requesting, transmitting, providing, and prompting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, requiring, verifying, conducting, determining, storing, associating, comparing, decrypting, retrieving, requesting, transmitting, providing, and prompting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the receiving, requiring, verifying, conducting, determining, storing, associating, comparing, decrypting, retrieving, requesting, transmitting, providing, and prompting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
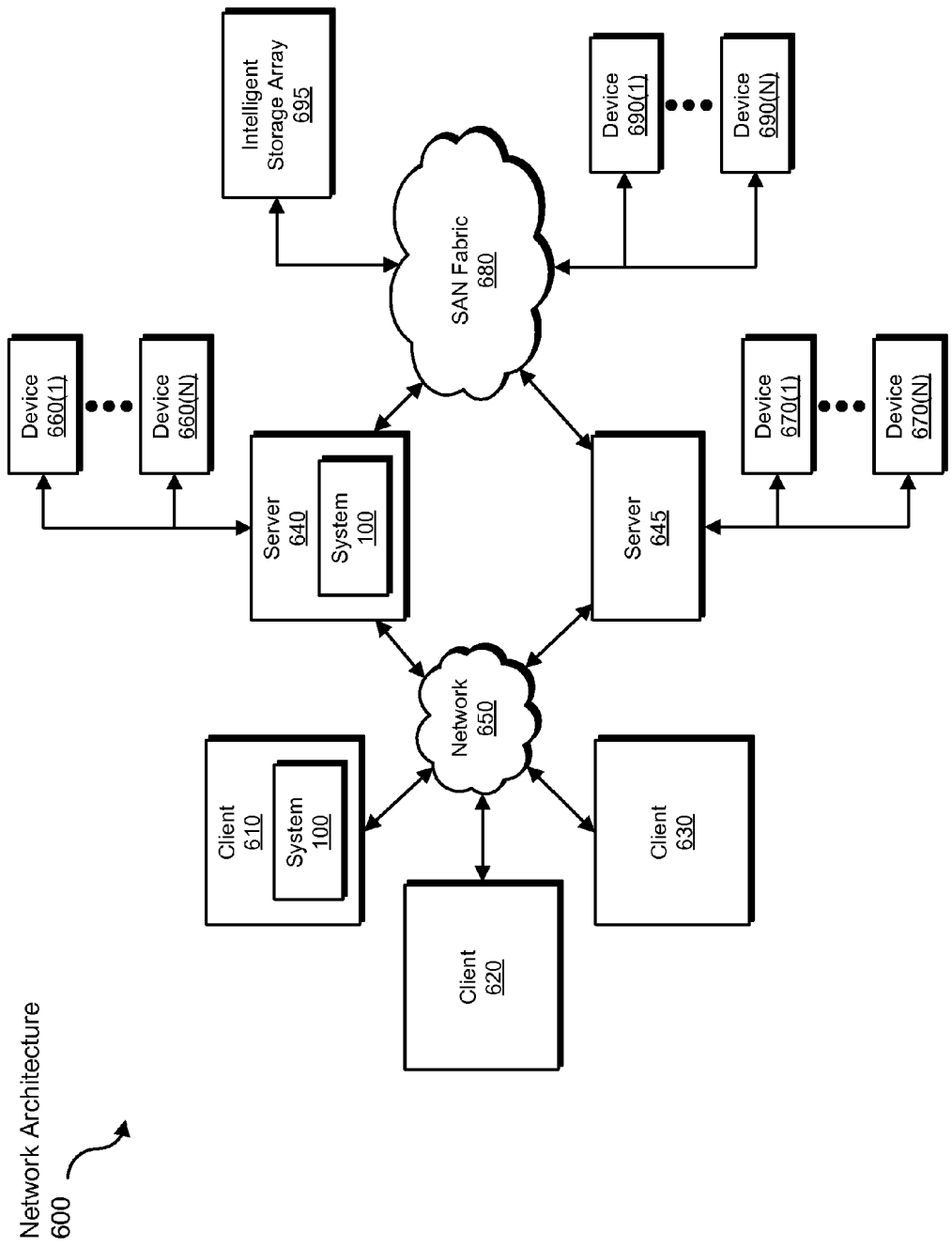
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include portions of system 100 from FIG. 1.

Similarly, servers 640 and 645 generally represent computing devices or systems, such as application servers or database servers, configured to provide various database services and/or run certain software applications. In one example, server 640 may include portions of system 100 from FIG. 1. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, requiring, verifying, conducting, determining, storing, associating, comparing, decrypting, retrieving, requesting, transmitting, providing, and prompting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for using geo-location information in sensitive Internet transactions. In one example, such a method may include: 1) receiving, from a client device, a request to conduct an Internet transaction, 2) requiring geo-location information from the client device in order to conduct the Internet transaction, 3) receiving the geo-location information from the client device, 4) verifying the validity of the geo-location information, and then 5) conducting the Internet transaction.

In some examples, the method may also include determining, based on the geo-location information, the location of a user of the client device. The method may also include storing the geo-location information and/or the location of the user of the client device in a database. In addition, the method may include associating the geo-location information and/or the location of the user of the client device with the Internet transaction. In one example, the database may be maintained by a trusted third party.

Examples of geo-location information include, without limitation, raw GPS satellite signals, identification information for at least one GPS satellite, latitude and longitude coordinates, and/or a timestamp associated with the geo-location information. In addition, the geo-location information may be digitally signed by the client device, a GPS receiver in communication with the client device, and/or a GPS satellite.

In some examples, verifying the validity of the geo-location information may include determining whether signal strengths of the raw GPS satellite signals exceed a predetermined threshold, determining whether signal strengths of the raw GPS satellite signals vary by more than a predetermined threshold, and/or comparing signal strengths of the raw GPS satellite signals with a known location of at least one GPS satellite allegedly responsible for generating the raw GPS satellite signals. In other examples, verifying the validity of the geo-location information may include decrypting the digitally signed geo-location information.

In some embodiments, the method may also include identifying the location of a user involved in a prior Internet transaction by retrieving, from a database, geo-location information associated with the prior Internet transaction. The method may also include enabling an administrator of a client account to require geo-location information in order to conduct an Internet transaction involving the client account.

Examples of Internet transactions include, without limitation, e-commerce transactions, e-banking transactions, electronic communications with minors, electronic transactions with government entities, or any other potentially sensitive Internet transaction. In addition, in some examples, requiring the geo-location information may include requesting the geo-location information via a low-level authentication protocol, requesting the geo-location information via a high-level web API, and/or requesting the geo-location information via a web form.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using geo-location information in sensitive Internet transactions, at least a portion of the method being performed by a server comprising at least one processor, the method comprising:

receiving, by the server from a client device, a request to conduct an Internet transaction;

requesting, by the server from the client device, geo-location information in order to conduct the Internet transaction, the geo-location information comprising signal strengths of raw GPS satellite signals obtained from at least one GPS satellite via a GPS device;

receiving the geo-location information at the server from the client device;

verifying, by analyzing at the server the signal strengths of the raw GPS satellite signals received from the GPS satellite, that the geo-location information is not false or illegitimate;

conducting, by the server, the Internet transaction based on the verifying of the geo-location information.

2. The method of claim 1, further comprising determining, based on the geo-location information, the location of a user of the client device.

3. The method of claim 2, further comprising at least one of:

storing the geo-location information in a database;

storing the location of the user of the client device in a database.

4. The method of claim 3, further comprising at least one of:

associating the geo-location information with the Internet transaction;

associating the location of the user of the client device with the Internet transaction.

5. The method of claim 3, wherein the database is maintained by a trusted third party.

6. The method of claim 1, wherein the geo-location information further comprises at least one of:

identification information for at least one GPS satellite;

latitude and longitude coordinates;

a timestamp associated with the geo-location information.

7. The method of claim 1, further comprising at least one of:

determining whether the signal strengths of the raw GPS satellite signals exceed a predetermined threshold;

determining whether the signal strengths of the raw GPS satellite signals vary by more than a predetermined threshold;

comparing the signal strengths of the raw GPS satellite signals with a known location of at least one GPS satellite allegedly responsible for generating the raw GPS satellite signals.

8. The method of claim 1, further comprising identifying the location of a user involved in a prior Internet transaction by retrieving, from a database, geo-location information associated with the prior Internet transaction.

9. The method of claim 1, wherein the Internet transaction comprises:

an e-commerce transaction;

an e-banking transaction;

an electronic communication with a minor;

an electronic transaction with a government entity.

10. The method of claim 1, wherein requiring the geo-location information comprises at least one of:

requesting the geo-location information via a low-level authentication protocol;

requesting the geo-location information via a high-level web API;

requesting the geo-location information via a web form.

11. The method of claim 1, further comprising enabling an administrator of a client account to require geo-location information in order to conduct an Internet transaction involving the client account.

12. A non-transitory computer-readable-storage medium comprising computer-executable instructions that, when executed by at least one processor of a server, cause the processor to perform the method of:

receiving, by the server from a client device, a request to conduct an Internet transaction;

requesting, by the server from the client device, geo-location information in order to conduct the Internet transaction, the geo-location information comprising signal strengths of raw GPS satellite signals obtained from at least one GPS satellite via a GPS device;

receiving the geo-location information at the server from the client device;

verifying, by analyzing at the server the signal strengths of the raw GPS satellite signals received from the GPS satellite, that the geo-location information is not false or illegitimate;

conducting, by the server, the Internet transaction based on the verifying of the geo-location information.

* * * * *